(12) United States Patent
Nakayama et al.

(10) Patent No.: US 10,062,891 B2
(45) Date of Patent: Aug. 28, 2018

(54) WIRING MODULE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Osamu Nakayama, Mie (JP); Mitsutoshi Morita, Mie (JP); Tetsuya Fujita, Mie (JP)

(73) Assignees: AutoNetworks Technologies, Ltd. (JP); Sumitomo Wiring Systems, Ltd. (JP); Sumitomo Electric Industries, Ltd. (JP)

( * ) Notice: Subject to any disclaimer, the term of this patent is extended or adjusted under 35 U.S.C. 154(b) by 149 days.

(21) Appl. No.: 15/129,878

(22) PCT Filed: Apr. 3, 2015

(86) PCT No.: PCT/JP2015/060559
§ 371 (c)(1),
(2) Date: Sep. 28, 2016

(87) PCT Pub. No.: WO2015/163113
PCT Pub. Date: Oct. 29, 2015

(65) Prior Publication Data
US 2017/0141375 A1    May 18, 2017

(30) Foreign Application Priority Data

Apr. 21, 2014 (JP) ................ 2014-087191

(51) Int. Cl.
*H01M 2/20* (2006.01)
*H01G 2/02* (2006.01)
(Continued)

(52) U.S. Cl.
CPC .............. *H01M 2/206* (2013.01); *H01G 2/02* (2013.01); *H01M 2/1077* (2013.01); *H01M 10/482* (2013.01); *H01M 2220/20* (2013.01)

(58) Field of Classification Search
None
See application file for complete search history.

(56) References Cited

U.S. PATENT DOCUMENTS 9,831,652 B2 * 11/2017 Nakayama .......... H01M 2/1077
2010/0104927 A1   4/2010 Albright
(Continued)

FOREIGN PATENT DOCUMENTS

| JP | 2012-164598 | 8/2012 |
| JP | 2013-37986 | 2/2013 |
| WO | 2012/078727 | 6/2012 |

OTHER PUBLICATIONS

International Search Report dated Jun. 16, 2015.
European Search Report dated Mar. 27, 2017.

*Primary Examiner* — Rena Dye Cronin
(74) *Attorney, Agent, or Firm* — Gerald E. Hespos; Michael J. Porco; Matthew T. Hespos

(57) ABSTRACT

A wiring module includes connecting members for electrically connecting electrode terminals of adjacent power storage elements, an insulating protector for accommodating the connecting members and an insulating cover for covering the insulating protector. The insulating cover is configured by arranging a plurality of division covers. At least one of the division covers is formed with an overlapping portion to be overlapped with an adjacent one of the division covers.

6 Claims, 11 Drawing Sheets

(51) Int. Cl.
*H01M 2/10* (2006.01)
*H01M 10/48* (2006.01)

(56) References Cited

U.S. PATENT DOCUMENTS

| | | | |
|---|---|---|---|
| 2012/0244398 A1* | 9/2012 | Youngs | B60K 6/28 |
| | | | 429/61 |
| 2012/0249079 A1 | 10/2012 | Bennett et al. | |
| 2013/0189549 A1* | 7/2013 | Nemoto | H01M 10/482 |
| | | | 429/7 |
| 2013/0309553 A1* | 11/2013 | Kinoshita | H01M 2/1077 |
| | | | 429/158 |
| 2014/0370341 A1 | 12/2014 | Oshiba et al. | |

* cited by examiner

WIRING MODULE

BACKGROUND

1. Field of the Invention

The present invention relates to a wiring module.

2. Description of the Related Art

A power storage module has a plurality of power storage elements, each of which includes positive and negative electrode terminals. An insulating cover is mounted on a surface on an electrode terminal side for insulation from outside. Japanese Unexamined Patent Publication No. 2012-164598 discloses a busbar module to be mounted on a battery assembly composed of a plurality of batteries. The busbar module of Japanese Unexamined Patent Publication No. 2012-164598 includes a plate accommodating a busbar and two insulating covers overlapped with this plate. The two insulating covers have the same shape and size and are arranged side by side.

Parts of the plate where the insulating covers are mounted are not necessarily flat as in Japanese Unexamined Patent Publication No. 2012-164598. For example, in the case of insulating a connecting part of a terminal connected to a thick wire for transferring a large current and an electrode terminal located at an end of series connection, an insulating wall or the like preferably projects on the plate to insulate this connecting part. However, in this case, a non-flat part is present on the upper surface of the plate due to the insulating wall, thereby presenting a problem that the shape of the insulating cover becomes complicated according to the shape of the plate and the production cost of the insulating cover increases.

The present invention was completed based on the above situation and aims to provide a wiring module with an insulating cover capable of facilitating an assembling operation while suppressing production cost.

SUMMARY

The present invention is directed to a wiring module to be mounted on a power storage element group formed by arranging a plurality of power storage elements each having positive and negative electrode terminals. The wiring module includes connecting members for electrically connecting the electrode terminals of adjacent power storage elements, an insulating protector for accommodating the connecting members, and an insulating cover for covering the insulating protector. The insulating cover is configured by arranging a plurality of division covers, and at least one division cover is formed with an overlapping portion to be overlapped with an adjacent division cover. According to this configuration, since the insulating protector is covered with the plurality of division covers, an assembling operation of the insulating cover can be performed easily as compared to the case where the insulating protector is covered with one insulating cover.

The insulating protector could have a part that cannot be covered with the insulating cover. However, the entire insulating protector can be covered by the overlapping portion of at least one division cover being overlapped with the adjacent division cover even if the shape of each division cover is not complicated. This eliminates the need for complicating the shapes of the division covers and suppresses the cost for forming the division covers. Therefore, the assembling operation can be performed easily while production cost is suppressed.

The plural division covers may have the same shape. Thus, a common mold can be used to produce the division covers.

An external connection cover may be provided to insulate the electrode terminal located on an end part in an arrangement direction and to be connected to outside, and the division cover may be formed with a cut portion to avoid the external connection cover. Thus, the insulating protector can be covered with the division covers while the cut portion avoids the external connection cover.

An auxiliary cover may be provided to insulate the electrode terminal located on an end part in an arrangement direction and may not be connected to outside, and the division cover arranged adjacent to the auxiliary cover may e formed with an auxiliary cover holding portion for holding the auxiliary cover in a closed state. Thus, the auxiliary cover can be held in the closed state by the division cover.

The division cover may include a locked portion for holding the division cover in a closed state by being locked to the insulating protector.

According to the present invention, it is possible to perform an assembling operation easily while suppressing production cost.

DETAILED DESCRIPTION

One embodiment is described with reference to FIGS. 1 to 11.

Figure 1:
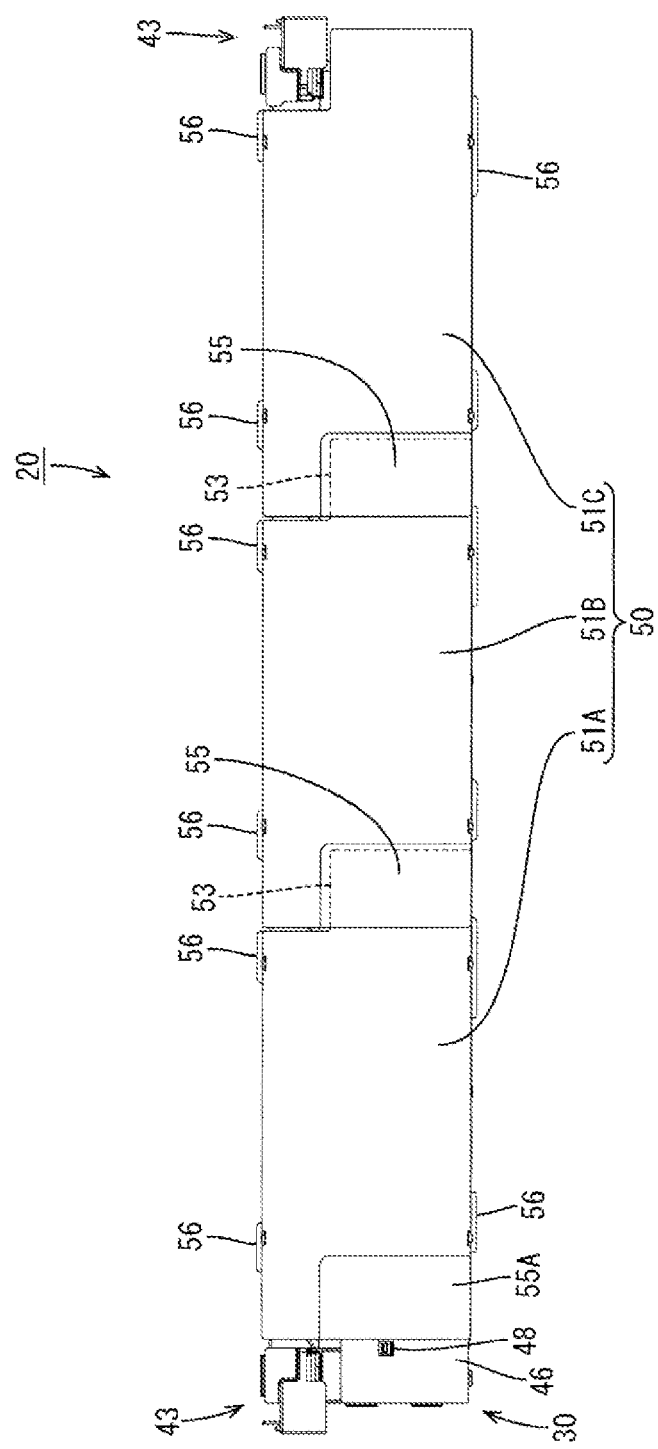
FIG. 1 is a plan view showing a wiring module mounted with an insulating cover of one embodiment.
Figure 2:
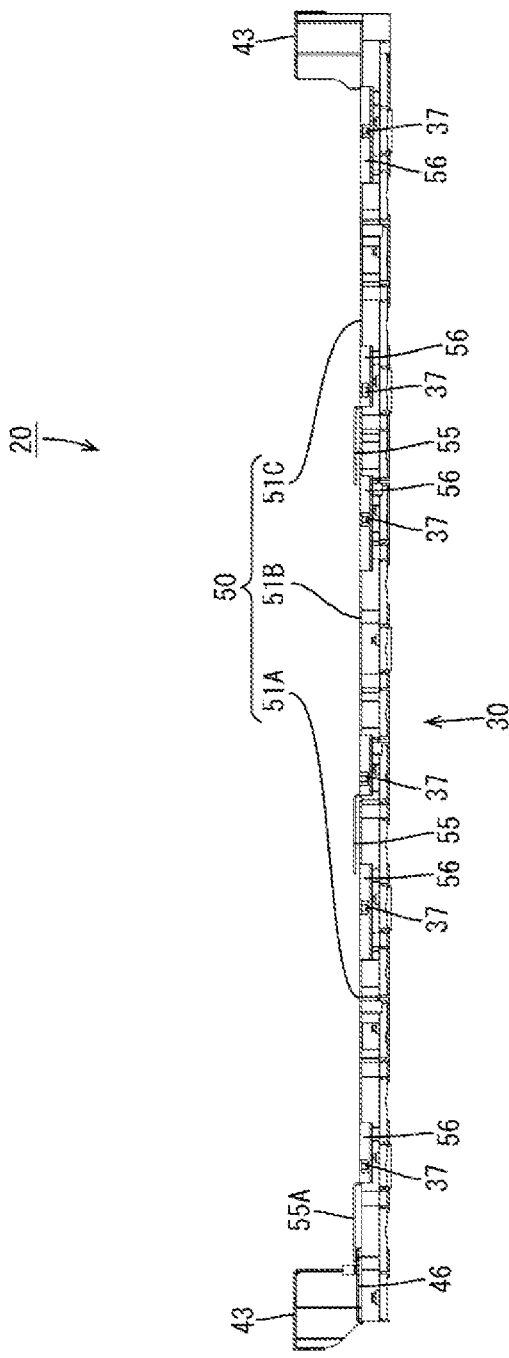
FIG. 2 is a front view of the wiring module mounted with the insulating cover.

A wiring module 20 of this embodiment configures a power storage module used as a power source for driving a vehicle (not shown) such as an electric vehicle or a hybrid vehicle by being mounted on a power storage element group 10. In the following description, lower and upper sides of FIG. 1 are referred to as front and rear sides concerning a front-back direction and vertical and lateral directions are based on directions of FIG. 2.

Figure 3:
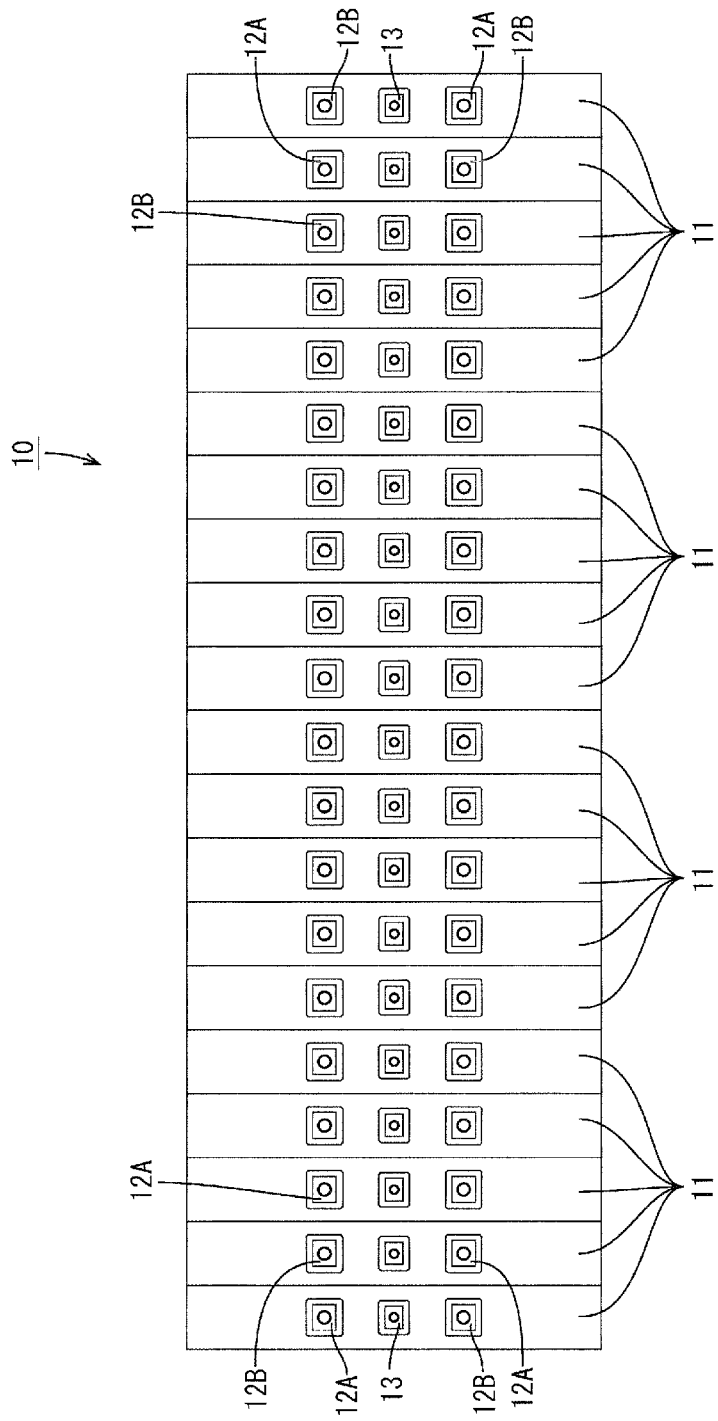
FIG. 3 is a plan view showing a power storage element group.

As shown in FIG. 3, the power storage element group 10 is configured by arranging a plurality of (twenty in this embodiment) power storage elements 11. Each power storage element 11 has a flat and substantially rectangular parallelepiped shape and an unillustrated power storage part is accommodated inside. Electrode terminals 12A, 12B

(positive electrode terminal is denoted by 12A and negative electrode terminal is denoted by 12B) and a voltage detection electrode 13 project upward on the upper surface of the power storage element 11. The respective power storage elements 11 are so oriented that adjacent electrode terminals 12A, 12B have opposite polarities.

(Wiring Module 20)

Figure 4:
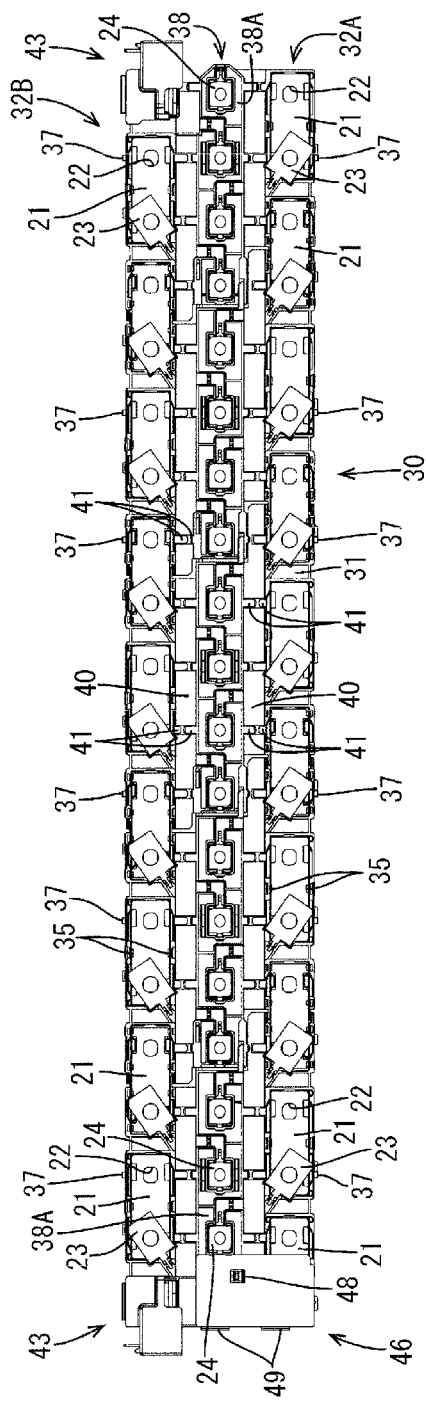
FIG. 4 is a plan view showing the wiring module with the insulating cover removed and an auxiliary cover closed.
Figure 5:
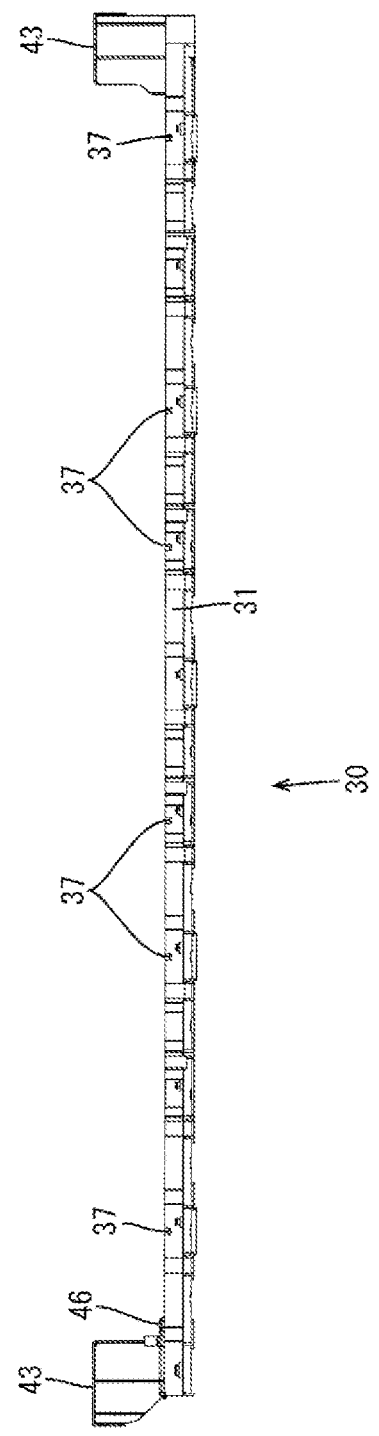
FIG. 5 is a front view showing the wiring module with the insulating cover removed and the auxiliary cover closed.

The wiring module 20 is mounted on a surface of the power storage element group 10 on the side of the electrode terminals 12A, 12B and includes, as shown in FIGS. 1 and 4, a plurality of connecting members 21 for connecting laterally adjacent electrode terminals 12A, 12B, voltage detection terminals 23, 24, an insulating protector 30 for accommodating the connecting members 21 and the voltage detection terminals 23, 24, and an insulating cover 50 for covering the insulating protector 30.

(Connecting Member 21)

Figure 6:
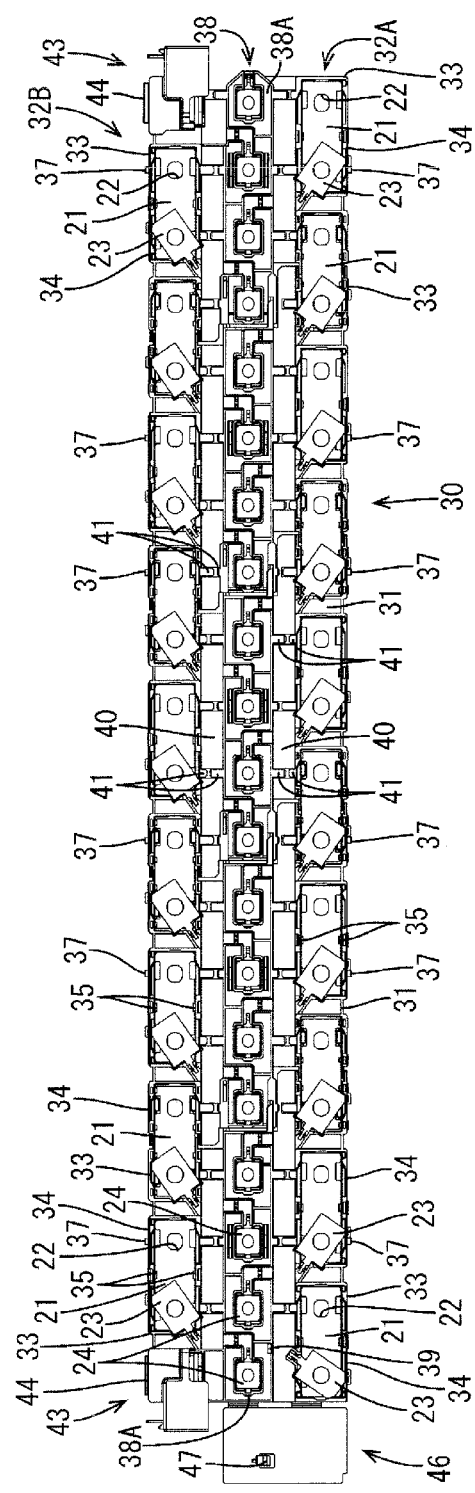
FIG. 6 is a plan view showing the wiring module with the insulating cover removed and the auxiliary cover opened.

The connecting member 21 is in the form of a metal plate made of copper, copper alloy, aluminum, aluminum alloy, stainless steel (SUS) or the like. As shown in FIG. 6, left and right through holes 22, through which the bar-like electrode terminals 12A, 12B are inserted (through which bolts are inserted if the electrode terminals are in the form of nuts), penetrate through each of a plurality of connecting members 21 for connecting the laterally adjacent electrode terminals 12A, 12B. The through hole 22 has an elliptical shape long in the lateral direction. The voltage detection terminal 23 is placed on the connecting member 21.

Note that the electrode terminals 12A, 12B on ends of series connection are connected to unillustrated external connection terminals. This external connection terminal includes a plate-like part to be connected to the electrode terminal 12A, 12B on the end of series connection and a stud bolt capable of connecting a terminal or the like on an end part of an unillustrated wire connected to a device such as an inverter, is accommodated in the insulating protector 30 and has an upper side covered with an external connection cover 43.

(Voltage Detection Terminals 23, 24)

The voltage detection terminal 23, 24 is for detecting a voltage of the power storage element 11, includes through holes through which the electrode terminal 12A, 12B is to be inserted and has an end part of an unillustrated voltage detection wire connected thereto such as by crimping. The voltage detection wire is connected to an unillustrated external ECU (Engine Control Unit). The ECU is equipped with a microcomputer, elements and the like and has a known configuration provided with functions of detecting voltages, currents, temperatures and the like of the power storage elements 11, controlling the charging and discharging of each power storage element 11 and the like.

(Insulating Protector 30)

The insulating protector 30 is formed of insulating synthetic resin, has a rectangular shape long in the lateral direction (arrangement direction of the connecting members) and is configured by coupling a plurality of members divided in the lateral direction. This insulating protector 30 includes a protector main body 31 extending in the lateral direction, the external connection covers 43 and an auxiliary cover 46 for covering lateral end sides of the protector main body 31.

The protector main body 31 includes two connecting member accommodating rows 32A, 32B extending in the lateral direction and a detection accommodating row 38 provided between the connecting member accommodating rows 32A, 32B. Connecting member accommodating portions 33 for accommodating a plurality of connecting members 21 are arranged in the connecting member accommodating rows 32A, 32B, and detection accommodating portions 38A for accommodating a plurality of voltage detection terminals 23, 24 are arranged in the lateral direction in the detection accommodating row 38. The connecting member accommodating row 32A on a front end side and the connecting member accommodating row 32B on a rear end side are shifted from each other by a lateral dimension of one power storage element 11 (half the connecting member accommodating portion 33) in the lateral direction. Spaces between the connecting member accommodating rows 32A, 32B and the detection accommodating row 38 serve as wire arrangement grooves 40 in which the voltage detection wires are to be arranged. Strip-like holding pieces 41 for holding the voltage detection wires in the wire arrangement grooves 40 project on upper end parts of groove walls of the wire arrangement grooves 40.

The connecting member 21 is placed on an unillustrated bottom plate of the connecting member accommodating portion 33 and is surrounded by an insulating wall 34 in the form of a rectangular tube. The insulating wall 34 is set to have a height capable of preventing a tool and the like from contacting the connecting member 21 and a fastening member to cause a short circuit. The insulating wall 34 includes a plurality of recesses into which corner parts of the voltage detection terminal 23, 24 are fit to be positioned. Separation restricting pieces 35 for restricting the separation of the connecting member 21 are deflectably and deformably provided on the inner surface of the insulating wall 34.

Locking portions 37 for holding the insulating cover 50 in a closed state by being locked to locked portions 56 of the insulating cover 50 project on the front surface (front end surface) and the rear surface (rear end surface) of the insulating protector 30. The locking portion 37 is shaped such that a lower end projects in a stepped manner and an upper side is inclined to reduce a projection distance. An auxiliary locking portion 39 for holding the auxiliary cover 46 in a closed state is formed near the detection accommodating portion 38A on the left end side of the insulating protector 30. The auxiliary locking portion 39 is shaped such that a lower end projects backward in a stepped manner and an upper side is inclined to reduce a projection distance.

Figure 7:
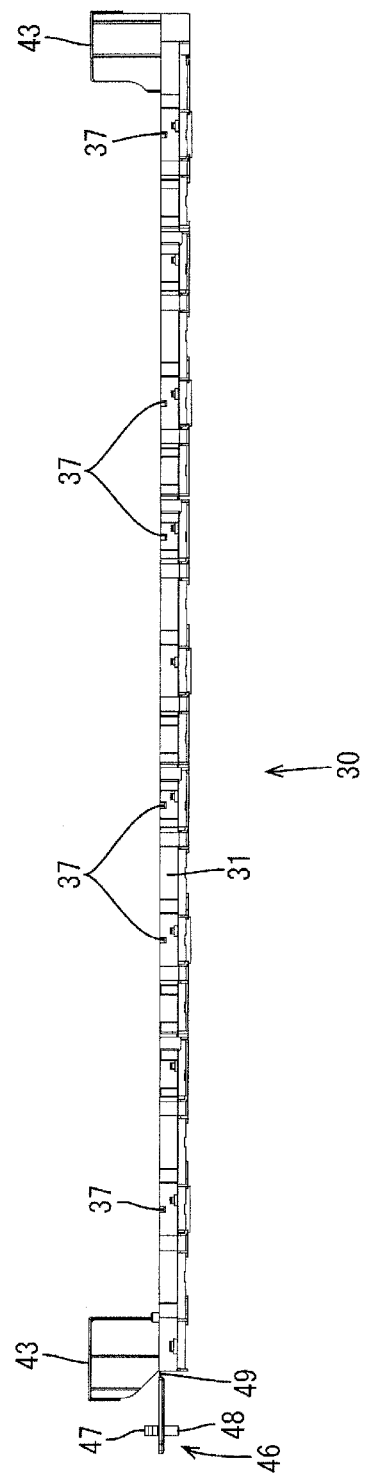
FIG. 7 is a front view showing the wiring module with the insulating cover removed and the auxiliary cover opened.

The external connection cover 43 is in the form of an insulating box arranged at a position for covering the electrode terminal 12A (12B) located at the end of series connection, the external connection terminal and the wire connected to this external connection terminal and capable of insulating these from outside, and is connected to an upper end part of a rear wall of the protector main body 31 via a hinge portion 44. A power wire connected to the electrode terminal 12A (12B) located on the end of series connection via the external connection terminal is a thick wire corresponding to power. Thus, as shown in FIG. 7, the external connection cover 43 is shaped to protrude upwardly while having a size enabling the passage of the wire and the external connection terminal inside, and projects upward from the upper surface of the protector main body 31 with the external connection cover 43 closed. Note that a clearance is formed between the right end of the protector main body 31 and the left end of a division cover 51A to be described after.

The auxiliary cover 46 is in the form of a rectangular plate and connected to an upper end part of a side wall on the left end side (one side in the lateral direction) of the protector main body 31 via a hinge portion 49. The auxiliary cover 46 is sized to cover a left half of the connecting member 21 on the left end and the voltage detection terminal 24, and an end part on the side of the insulating cover 50 extends up to a position overlapping with a left end part of the insulating cover 50. This auxiliary cover 46 includes a grip 48 capable of being gripped by an operator and a resilient locked piece 47. The grip 48 is in the form of a projecting bar. The resilient engaged piece 47 is resiliently deformable and a claw having a step to be locked to the auxiliary locking portion 39 is formed on a tip part thereof. When the auxiliary cover 46 is rotated and closed, the resilient engaged piece 47 comes into contact with the auxiliary locking portion 39 to be deflected and deformed resiliently are restored resiliently to be locked to the auxiliary locking portion 39 so that the auxiliary cover 46 is held in the closed state.

(Insulating Cover 50)

As shown in FIG. 1, the insulating cover 50 is formed by arranging three (plural) division covers 51A to 51C in the lateral direction to cover the entire insulating protector 30 except the external connection covers 43 and the auxiliary cover 46.

(Division Covers 51A to 51C)

Since the three divided covers 51A to 51C have the same shape, the division cover 51B is mainly explained.

Figure 8:
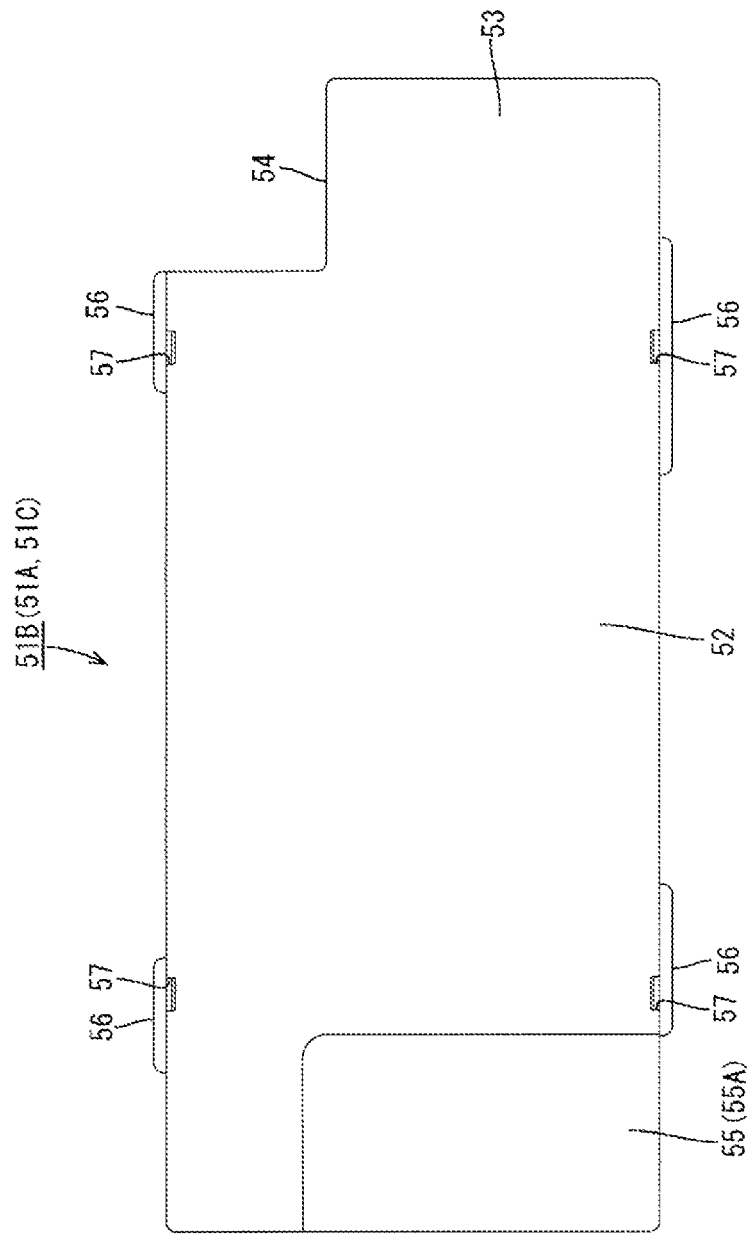
FIG. 8 is a plan view showing the insulating cover.
Figure 9:
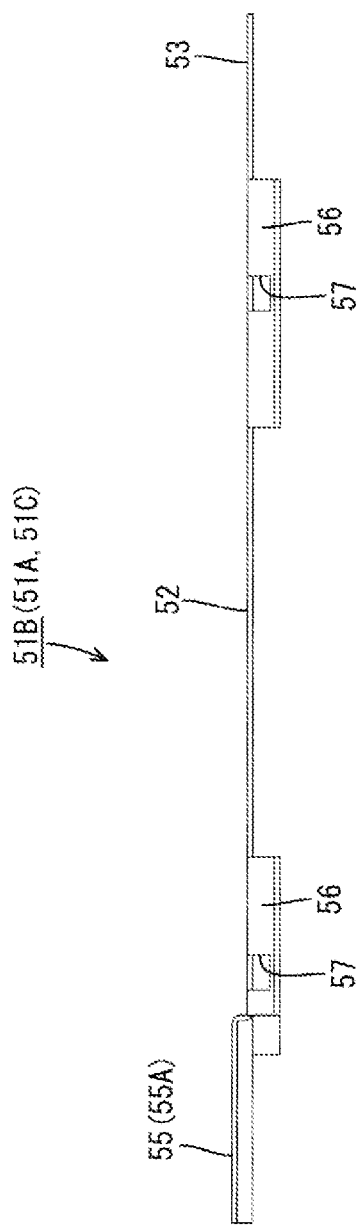
FIG. 9 is a front view showing the insulating cover.

The division cover 51A to 51C is made of insulating synthetic resin and includes, as shown in FIGS. 8 and 9, a cover main body 52 for covering a predetermined range of the upper surface of the insulating protector 30, an overlapping portion 55 integrally connected to the cover main body 52 and overlapping with the adjacent division cover 51A and locked portions 56 projecting in a direction perpendicular to the cover main body 52 from an edge part of the cover main body 52 and to be locked to the locking portions 37 of the insulating protector 30.

The cover main body 52 is in the form of a plate extending in a cranked manner on the same plane, a left side (one side in the lateral direction) having a smaller width is connected to and behind the overlapping portion 55 and a right side is reduced in width by having a rear side cut by a cut portion 54, thereby serving as an overlapped portion 53 on which the overlapping portion 55 of the at division cover 51C is overlapped.

The overlapping portion 55 has the same thickness as the cover main body 52, has a rectangular shape and extends in parallel to the cover main body 52 at a position higher than the upper surface of the cover main body 52 (position at least higher than the thickness of the cover main body 52). Thus, when the overlapping portion 55 is overlapped with the overlapped portion 53 of the adjacent division cover 51A, a clearance of a predetermined dimension is formed between the overlapping portion 55 and the overlapped portion 53.

Note that, in the division cover 51A on the left end, a part corresponding to the overlapping portion 55 of the division cover 51B serves as an auxiliary cover holding portion 55A for holding the auxiliary cover 46 in the closed state. A left end part of the auxiliary cover holding portion 55A comes into contact with a right end part of the upper surface of the auxiliary cover 46 with the auxiliary cover 46 closed, whereby no clearance is formed between the auxiliary cover holding portion 55A and the auxiliary cover 46. Thus, the entrance of external matter through a clearance between the division cover 51A and the auxiliary cover 46 can be prevented.

The locked portion 56 is U-shaped while forming a locking hole 57 between the cover main body 52 and the locked portion 56. Two of the locked portions 56 are provided at a predetermined distance from each other on each of the front and rear ends of the cover main body 52. The locked portions 56 are thinned to be resiliently deformable. When the division cover 51A to 51C is mounted on the insulating protector 30, the locked portions 56 come into contact with the locking portions 37 of the insulating protector 30 to be deformed resiliently. When the locking portions 37 reach the locking holes 57, the locked portions 56 are restored and hole edges of the locking holes 57 are locked to the locking portions 37 so that the division cover 51A to 51C is held in the closed state.

Next, the assembling of the power storage module is described.

The connecting members 21 are accommodated into the connecting member accommodating portions 33 of the insulating protector 30 with the external connection covers 43 and the auxiliary cover 46 opened and the plurality of voltage detection terminals 23, 24 connected to the end parts of the unillustrated voltage detection wires are mounted at predetermined positions. Subsequently, the external connection covers 43 and the auxiliary cover 46 are rotated and set at closed positions (FIG. 4).

Figure 10:
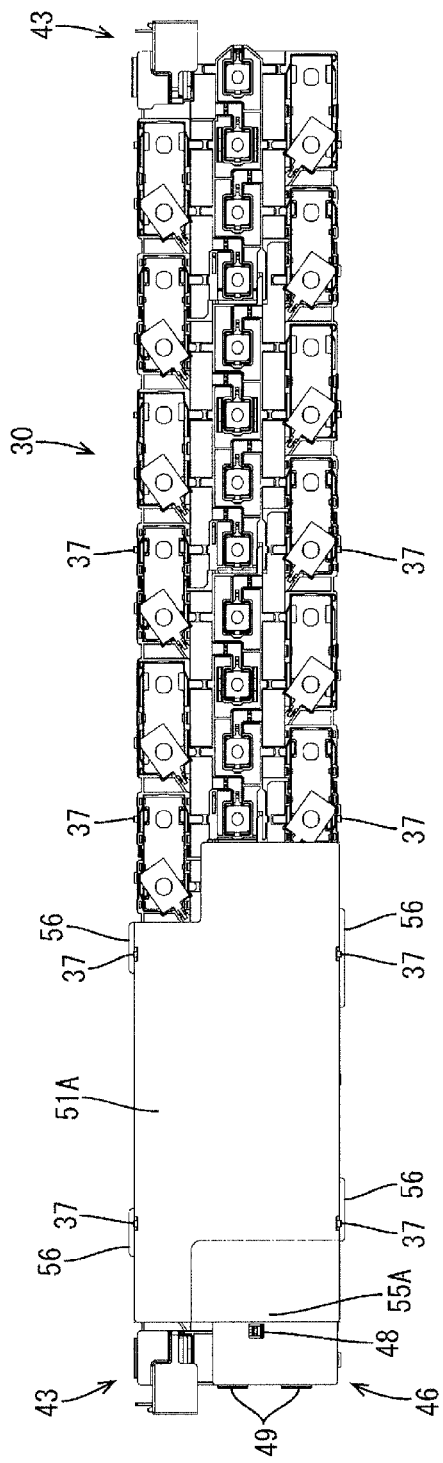
FIG. 10 is a plan view showing the wiring module with one division cover mounted.
Figure 11:
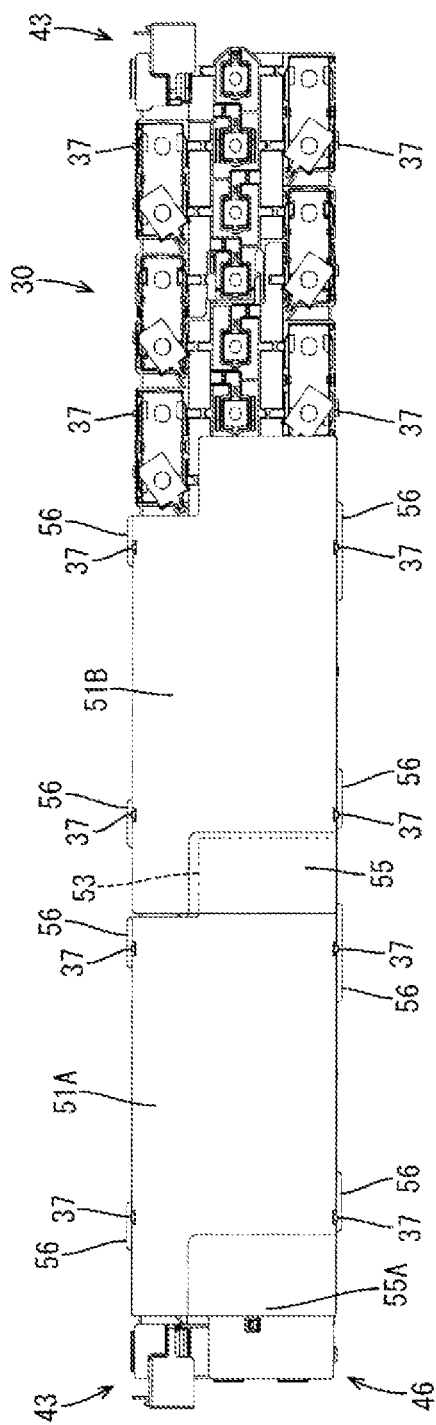
FIG. 11 is a plan view showing the wiring module with two division covers mounted.

Then, as shown in FIG. 10, the division cover 51A is mounted at a predetermined position on the left side of the insulating protector 30 by locking the locked portions 56 of the division cover 51A to the locking portions 37. At this time, the left end part of the auxiliary cover holding portion 55A comes into contact with a right end part of the auxiliary cover 46. Subsequently, when the division cover 51B is mounted to be arranged to the right of the division cover 51A as shown in FIG. 11, the overlapping portion 55 of the division cover 51B is overlapped with the overlapped portion 53 of the division cover 51A. Subsequently, when the division cover 51C is mounted to be arranged to the right of the division cover 51B, the overlapping portion 55 of the division cover 51C is overlapped with the overlapped portion 53 of the division cover 51B and a part of the external connection cover 43 on the right end side is arranged in the cut portion 54 of the division cover 51C.

In this way, the wiring module 20 is formed.

In the case of mounting this wiring module 20 on the power storage element group 10, the wiring module 20 is placed on the power storage element group 10 and the connecting members 21 are fastened to the electrode terminals 12A, 12B by unillustrated fastening members to form a power storage module. This power storage module then is accommodated at a predetermined position in the vehicle, the external connection covers 43 are opened and the end parts of the wires connected to an external device, such as an inverter, are connected via the external connection terminals and, thereafter, the external connection covers 43 are closed.

According to this embodiment, the following functions and effects are exhibited.

According to this embodiment, the insulating protector 30 is covered with the plurality of division covers 51A to 51C. Thus, assembling operability of the insulating cover 50 can be improved as compared to the case where the insulating protector 30 is covered with one insulating cover 50.

Further, the external connection covers 43 may be provided to insulate, for example, the connecting parts of the electrode terminals 12A, 12B on end parts in the arrangement direction from outside and the upper surface shape of the insulating protector 30 may be complicated. However, the overlapping portion 55 formed by recessing (at least one) division cover 51B, 51C out of the plurality of adjacent division covers 51A to 51C is overlapped with the overlapped portion 53 of the division cover 51A, 51B. As a result, the entire insulating protector 30 can be covered without complicating the shape of each division cover 51A to 51C. Thus, the shapes of the division covers 51A to 51C need not be complicated, and the cost of a mold for forming the division covers 51A to 51C can be suppressed. Therefore, an assembling operation can be performed easily while production cost is suppressed.

The plurality of division covers 51A to 51C may have the same shape. Thus, a common mold can be used to produce the plurality of division covers 51A to 51C.

The external connection covers 43 for insulating the electrode terminals 12A, 12B to be connected to outside are provided on the end parts in the arrangement direction, and the division cover 51C is formed with the cut 54 cut to avoid the external connection cover 43. Thus, the division cover 51C can cover the insulating protector 30 while the cut 54 avoids the external connection terminal 43.

The auxiliary cover 46 for insulating the electrode terminal 12B not to be connected to outside is provided on the end part in the arrangement direction, and the division cover 51A arranged adjacent to the auxiliary cover 46 is recessed to form the auxiliary cover holding portion 55A for holding the auxiliary cover 46 in the closed state. By doing so, the auxiliary cover 46 can be held in the closed state by the division cover 51A and the clearance formed between the auxiliary cover 46 and the division cover 51A can be suppressed.

The invention is not limited to the above described and illustrated embodiment. For example, the following embodiments also are included in the scope of the invention.

Although all the division covers 51A to 51C have the same shape in the above embodiment, there is no limitation to this and they may have different shapes. Further, the shape and the size of the overlapping portion 55 are not limited to the shape and the size of the above embodiment and can be changed appropriately according to the shape and the like of the insulating protector.

The number of the division covers 51A to 51C is not limited to the one of the above embodiment and can be appropriately changed according to the number of the power storage elements 11 and the size of the wiring module 20. Further, all the division covers need not be provided with the overlapping portion 55 and it is sufficient that at least one division cover includes the overlapping portion 55. Further, the overlapping portion 55 is a part overlapped on the division cover, but a part overlapped under the division cover may be an overlapping portion.

Although the power storage element 11 is a battery, there is no limitation to this and it may be a capacitor or the like.

Although the division cover 51B, 51C is formed with the overlapping portion 55 configured to overlap with the adjacent division cover 51A, 51B, this part 55 may be formed to be recessed or projecting on the end part of the other division cover 51B, 51C so as to correspond to an overlapping shape on the end part of one division cover 51A, 51B.

LIST OF REFERENCE SIGNS

10: power storage element group
11: power storage element
12A, 12B: electrode terminal
20: wiring module
21: connecting member
30: insulating protector
37: locking portion
43: external connection cover
46: auxiliary cover
50: insulating cover
51A to 51C: division cover
52: cover main body
54: cut portion
55: overlapping portion
56: locked portion

The invention claimed is:

1. A wiring module to be mounted on a power storage element group formed by arranging a plurality of power storage elements each having positive and negative terminals, comprising:
    connecting members for electrically connecting the electrode terminals of adjacent ones of the power storage elements;
    an insulating protector for accommodating the connecting members; and
    an insulating cover for covering the insulating protector; and
    an external connection cover for insulating the electrode terminal located on an end part in an arrangement direction and to be connected to outside,
    wherein:
    the insulating cover is configured by arranging a plurality of division covers; and
    at least one of the division covers is formed with an overlapping portion to be overlapped with an adjacent one of the division covers; and
    at least one of the division covers is formed with a cut to avoid the external connection cover.

2. The wiring module of claim 1, wherein the division covers have the same shape.

3. The wiring module of claim 1, wherein: the division cover includes a locked portion for holding the division cover in a closed state by being locked to the insulating protector.

4. A wiring module to be mounted on a power storage element group formed by arranging a plurality of power storage elements each having positive and negative electrode terminals, comprising:
    connecting members for electrically connecting the electrode terminals of adjacent ones of the power storage elements;
    an insulating protector for accommodating the connecting members;
    an insulating cover for covering the insulating protector, and
    an auxiliary cover for insulating the electrode terminal located on an end part in an arrangement direction and not to be connected to outside,
    wherein:
    the insulating cover is configured by arranging a plurality of division covers;
    at least one division cover of adjacent ones of the plurality of division covers is formed with an overlapping portion to be overlapped with the adjacent division cover; and
    the division cover arranged adjacent to the auxiliary cover is formed with an auxiliary cover holding portion for holding the auxiliary cover in a closed state.

5. The wiring module of claim 4, wherein the division covers have the same shape.

6. The wiring module of claim 5, wherein:
    the division cover includes a locked portion for holding the division cover in a closed state by being locked to the insulating protector.

* * * * *